United States Patent
Rubin et al.

[15] 3,663,168

[45] May 16, 1972

[54] METHOD OF PRODUCING CONCENTRATED PHOSPHORIC ACID

[72] Inventors: Allen G. Rubin, Walnut Creek; Nicholas Kalmar, Berkeley, both of Calif.

[73] Assignee: B. D. Bohna & Company, Inc., San Francisco, Calif.

[22] Filed: July 3, 1969

[21] Appl. No.: 838,964

[52] U.S. Cl.................................................23/165, 23/107
[51] Int. Cl................C01b 15/18, C01b 25/28, C01b 25/22, C01b 25/30
[58] Field of Search....................23/165, 165 C, 107; 71/43

[56] References Cited

UNITED STATES PATENTS

| | | | |
|---|---|---|---|
| 1,838,431 | 12/1931 | Milligan | 23/165 |
| 2,716,591 | 8/1955 | Thomsen | 23/107 X |
| 2,880,063 | 3/1959 | Baniel | 23/165 |
| 3,245,777 | 4/1966 | Chang | 71/39 |
| 3,408,161 | 10/1968 | Nickerson et al. | 23/165 |
| 3,466,141 | 9/1969 | Moldovan et al. | 23/107 |

*Primary Examiner*—Oscar R. Vertiz
*Assistant Examiner*—Gregory A. Heller
*Attorney*—Fryer, Tjensvold, Feix, Phillips & Lempio

[57] ABSTRACT

Monocalcium phosphate, advantageously in the form of single superphosphate or triple superphosphate, is mixed with sulfuric acid or ammonium bisulfate and methanol. The monocalcium phosphate and the sulfuric acid or ammonium bisulfate react to form phosphoric acid and a precipitate which contains calcium sulfate. The phosphoric acid is substantially entirely dissolved in the methanol. Next the methanol containing the dissolved phosphoric acid is separated from the solid precipitate by decantation, filtration or centrifugation. By evaporation of the methanol a phosphoric acid concentrate is obtained, or by the addition of a base to the methanolic acid solution, the corresponding phosphate salts are formed and precipitated in an easily separatable and dryable form.

7 Claims, 1 Drawing Figure

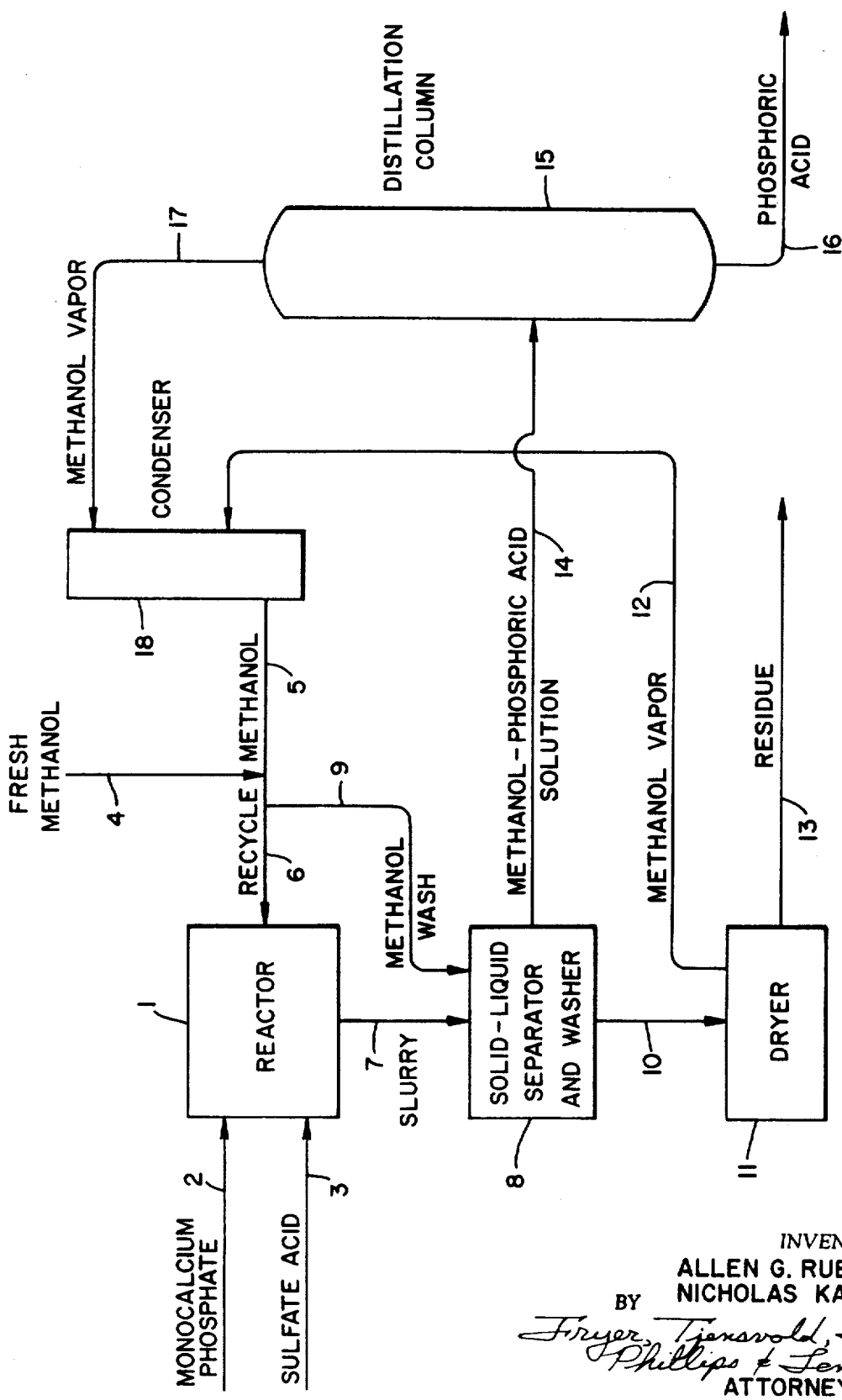

METHOD OF PRODUCING CONCENTRATED PHOSPHORIC ACID

BACKGROUND OF THE INVENTION

Monocalcium phosphate has been produced for many years in the form of single superphosphate or triple superphosphate by the acidulation of phosphate rock. Many plants use sulfuric acid as the acidulating agent to produce single superphosphate. The single superphosphate is usually blended with other materials and used as a fertilizer because of its available phosphate. However, the $P_2O_5$ content of single superphosphate is low, generally in the order of 20 to 22 percent, and therefore the value of the single superphosphate product is limited. The reaction of sulfuric acid with phosphate rock to produce monocalcium phosphate in the form of single superphosphate may be expressed as follows:

$CaF_2 \cdot 9CaO \cdot 3 P_2O_5 + 7H_2SO_4 \rightarrow 3Ca(H_2PO_4)_2 + 7CaSO_4 + 2HF$ Monocalcium phosphate is manufactured as triple superphosphate by reacting phosphate rock with phosphoric acid. This reaction is generally conducted by phosphoric acid producers who use impure phosphoric acid for acidulating phosphate rock. A substantial part of this impure phosphoric acid is sludge acid which is a byproduct left over from the clarification of the phosphoric acid prepared for commercial sale. The triple superphosphate contains approximately 46 percent available $P_2O_5$. However, the triple superphosphate is still a low value product compared to superphosphoric acid having a high $P_2O_5$ content. The reaction between phosphate rock and phosphoric acid to produce monocalcium phosphate in the form of triple superphosphate may be set forth as follows:

$CaF_2 \cdot 9CaO \cdot 3 P_2O_5 + 14 H_3PO_4 \rightarrow 10Ca(H_2PO_4)_2 + 2HF$

SUMMARY OF THE INVENTION

In accordance with the present invention, concentrated phosphoric acid of high purity is obtained from monocalcium phosphate present in single superphosphate or triple superphosphate by mixing monocalcium phosphate with methanol and an acidic sulfate selected from the group consisting of sulfuric acid and ammonium bisulfate. For each part (weight) of the monocalcium phosphate used in the process from about 0.8 to 10 parts, preferably 1 to 3 parts, of methanol are employed. For each mol of the monocalcium phosphate in the process feed an amount of the acid in the range from about 0.5 to 2.0, preferably 0.9 to 1.2, times the metathetical requirement is used. The period of slurrying (mixing) the process feed is not particularly critical. Depending upon the intensity of agitation and the particle size of the monocalcium phosphate the period of mixing is from about 1 minute to 10 hours. During mixing the temperature of the mixture is maintained at or below the boiling point of the methanol.

The solid and liquid fractions of the resulting slurry are then separated by a suitable mechanical means such as filtration, centrifugation or decantation, preferably by centrifugation. The solid fraction of the slurry is mainly calcium sulfate and impurities which are insoluble in methanol. The liquid fraction is a useful methanolic solution of phosphoric acid which may be conveniently concentrated to phosphoric acid by evaporation of the methanol or converted to useful phosphate salts by neutralization with a suitable inorganic base. In the latter case, the salts produced precipitate from the methanolic solution and may be conveniently recovered by filtration.

Surprisingly, the formation of calcium sulfate as a precipitate at the liquid-solid phase interface of the slurry does not interfere with the substantially total (90 percent plus) conversion of the water soluble phosphorous values in the feed to phosphoric acid. Water in any appreciable amount is neither necessary nor desirable for the practice of the instant process. Water which may be present in the monocalcium salt feed or acid is extracted by the methanol and in the main remains with the phosphoric acid when the methanol is evaporated. Thus water, if present, in the process feed lowers the $P_2O_5$ value (weight percent) of the recovered phosphoric acid or must be removed by heating the acid at an elevated temperature (100° – 300° C.).

The presence of a substantial amount of water in the present slurry system is undesirable where relatively high purity product is desired because in this event the water tends to increase the solubility of impurities, salts and the like, in the methanolic solution. These, of course, end up in the phosphoric acid concentrate. A substantial amount of water based upon methanol, is in general an amount above about 15 parts (weight) per 100 parts of methanol.

On the other hand, the complete miscibility of water with methanol is advantageous where relatively wet monocalcium phosphate salt feed must be used or where only relatively dilute (60–75 percent) acid is available for the acidification. So long as the water content of the slurry relative to methanol does not exceed 50–60 parts per 100 parts of methanol, a useful extraction of phosphoric acid can be achieved in a single liquid phase system, although as noted above, the removal of the water and impurities from the phosphoric acid concentrate adds to the process burden. Preferably the amount of water present in the slurry is less than 5 parts per 100 parts of methanol.

Therefore, in the instant process the use of methanol, which is an excellent solvent for both water and phosphoric acid, provides a single liquid phase system which reduces the handling problems in the process, minimizes solvent losses, allows flexibility in the choice of the acid reactant, and permits the phosphoric acid compound to be separated directly from the solvent.

The process of the present invention provides unique advantages including: (1) the production and extraction of phosphoric acid from monocalcium phosphate in a single reaction stage; (2) an efficient simple reaction system usually capable of yields of over 90 percent of the water soluble $P_2O_5$ content of the superphosphate starting feed; and in general of yields of over 80 percent of the total $P_2O_5$; (3) the use of a process medium having a high solvent selectivity effect in that methanol solubilizes phosphoric acid and at the same time rejects (as a solvent), impurities normally associated with fertilizer grade monocalcium phosphates; (4) the use of a solvent fully miscible with water obviating multiple liquid phase formations and phase separations as well as solute distribution problems between several liquid phases; (5) the use of a solvent having a relatively low boiling point and low latent heat of vaporization, thereby greatly reducing the process burden normally experienced; (6) the use of a liquid medium permitting direct recovery of the phosphoric acid concentrate from the solvent; (7) the use of a solvent which requires no cosolvent for effective practice of the invention.

By the metathetical requirement as used herein is meant the number of equivalents, acid-base, of the sulfate acid required to liberate phosphoric acid from 1 mol of the monocalcium phosphate feed. The theoretical value is 2 equivalents of acid per mol of the salt. However, where the monocalcium phosphate salt feed is somewhat impure and contains inert matter, or where a relatively higher purity phosphoric acid concentrate is desired, only about 1.8 equivalents of the acid should be used per mol of the salt. Where, on the other hand, it is desired to maximize phosphoric acid recovery or where a minor portion of the sulfate acid is lost to acid consuming side reactions, about 2.4 equivalents of the sulfate acid per mol of the monocalcium phosphate salt feed should be employed. In terms of the metathetical requirement the preferred range of acid is 0.9 – 1.2 times the metathetical value; broadly the range 0.5 – 2.0 is satisfactory. Sulfuric acid, of course, contains two equivalents of acid per mol whereas ammonium bisulfate contains but one equivalent per mol.

Monocalcium phosphate in general may be used as a process feed herein. Several forms are known and, of these, particularly desirable as feeds are the so-called single superphosphate and triple superphosphate of commerce.

The temperature used in the slurry reaction system of the process of the invention is desirably in the range below the boiling point of the methanol solvent and above about 0° C., preferably in the range from about 15° to 50° C. Higher temperatures may be used but such use is less economical because pressure equipment would then be necessary in order to maintain the methanol in the liquid phase. The use of lower temperatures on the other hand is increasingly unsatisfactory because of increasing viscosity effects and the like as the temperature is reduced.

The size of the monocalcium phosphate solids fed to the reactor may vary widely. Large pieces, as much as 2 inches in diameter and larger, may be employed satisfactorily, although for efficient recovery of the phosphoric acid content, residence times in the slurry reactor must be longer and agitation must be more intense where the feed has a relatively large size. Preferably, the monocalcium phosphate feed has a particle size on the order of granular range and smaller, below about an average diameter of approximately one-eighth of an inch. In the latter case, the phosphoric acid liberating reaction and the dissolution of the phosphoric acid in the methanol appears to occur almost immediately upon the mixing of the feed streams. Broadly satisfactory mixing or slurrying times are in the range from about 1 minute to 10 hours or more.

The monocalcium phosphate powder or granular material and the ammonium bisulfate or sulfuric acid are mixed together in a methanol solvent. Sufficient methanol is used to provide a stirrable slurry. If too much methanol is employed, the expense of the process is increased because the methanol must later be separated by evaporation or other means from the phosphoric acid compound product. For practical purposes it has been found that about one part of methanol to one part of solids provides a satisfactory reaction mixture.

Either sulfuric acid, ammonium bisulfate or mixtures thereof may be employed to acidify the monocalcium phosphate and produce phosphoric acid. The reaction with sulfuric acid may be set forth as follows:

$$Ca(H_2PO_4)_2 + H_2SO_4 \rightarrow CaSO_4 + 2 H_3PO_4$$

and the reaction of ammonium bisulfate is as follows:

$$Ca(H_2PO_4)_2 + 2 NH_4HSO_4 \rightarrow CaSO_4 + (NH_4)_2SO_4 + 2H_3PO_4$$

These acids may be characterized as sulfate acids selected from the group consisting of sulfuric acid and ammonium bisulfate. Both sulfuric acid and ammonium bisulfate react with the monocalcium phosphate substantially completely in the methanol solution.

The calcium from the monocalcium phosphate is precipitated as hydrated calcium sulfate or gypsum along with other impurities present in the starting material. In addition when ammonium bisulfate is used as the starting acid, ammonium sulfate is also precipitated.

A preferred embodiment of the process of the present invention is illustrated in the Figure. Into stirred tank reactor 1, granulated or powdered monocalcium phosphate via line 2, 93 percent sulfuric acid via line 3 and methanol (fresh make-up methanol via line 4 plus recycle methanol via line 5) via line 6 are charged in the relative proportions of 1–3 parts (weight) of methanol per part of the monocalcium phosphate salt and 1 mol of the sulfuric acid per mol of the salt, and the resulting slurry is stirred while maintaining the temperature of the mixture in the range 25°–40° C. After a residence time of 0.5 – 1 hour, the resulting reaction mixture is withdrawn from reactor 1 via line 7 and delivered to separator 8 (a centrifuge) wherein the solid fraction of the slurry is separated from the liquid fraction and is washed with added methanol via line 9, withdrawn from separator 8 via line 10 and delivered to dryer 11. The separated liquid fraction which is a methanolic solution of phosphoric acid extract plus a small quantity of the above noted methanol wash solution is withdrawn from separator 8 via line 14 and delivered to the distillation column 15 where methanol is fractionated from the phosphoric acid. Methanol vapor from distillation column 15 via line 17 and from dryer 11 via line 12 is delivered to condenser 18 and the recovered methanol is recycled to the process via line 5. The phosphoric acid concentrate from distillation column 15 is delivered to product storage via line 16 or for further processing as desired.

The phosphoric acid concentrates produced in accordance with this invention have a high $P_2O_5$ content, generally of the order of 50 to 60 percent by weight. By application of heat the concentrate may easily and economically be further concentrated to superphosphoric acid (a mixture of orthophosphoric and polyphosphoric acids) having about a 72 percent $P_2O_5$ content. Transportation costs per unit of $P_2O_5$ are, of course, substantially reduced.

As an alternative, phosphoric acid compounds may be precipitated from the methanol solution as salts. Neutralization of the phosphoric acid with ammonia results in the formation of a very pure ammonium phosphate precipitate having a high $P_2O_5$ value. This precipitate may be readily recovered by filtration and is a water soluble, valuable fertilizer. When a calcium compound is precipitated, a useful animal feed is produced. When sodium hydroxide is used to neutralize the methanolic phosphoric acid solution, sodium phosphate which is useful as a detergent additive is precipitated. Similarly, the use of potassium hydroxide for the neutralization yields potassium phosphate which is also a useful fertilizer.

The following examples further illustrate the practice of the invention. All references to amounts as parts are in parts by weight.

EXAMPLE I

Commercial run-of-pile triple superphosphate was employed in this example and had the following analysis:

| | |
|---|---|
| Total $P_2O_5$ | 47.20% |
| Water-soluble $P_2O_5$ | 41.78% |
| $SO_4$ | 3.87% |
| Ca | 14.20% |

30.0 parts of triple superphosphate were charged into a tank provided with an agitator. Next 43.0 parts of methanol and 21.2 parts of ammonium bisulfate were added to the tank. The resulting slurry was stirred for 4 hours — 50 minutes after which the slurry was filtered on a plate and frame filter press. The filtration residue was washed with fresh methanol to displace any remaining $P_2O_5$ laden solvent, and the washings were combined with the main filtrate. 63.9 parts of filtrate were obtained which contained a total of 12.31 parts of $P_2O_5$, 0.42 parts $NH_4$ and 2.18 parts of $SO_4$. The washed filtration residue was dried to remove adhered methanol. Upon analysis the dried residue was found to contain 1.85 parts of $P_2O_5$, 4.26 parts of Ca, 2.90 parts $NH_4$ and 16.68 parts of $SO_4$. The combined filtrate and washings were evaporated to recover the methanol and yielded a concentrated acid having the following weight analysis:

| | |
|---|---|
| $P_2O_5$ | 59.03% |
| $SO_4$ | 10.46% |
| $NH_4$ | 2.01% |
| F | 44 ppm |
| CaO | 15 ppm |
| $Al_2O_3$ | 40 ppm |
| $Fe_2O_3$ | 90 ppm |
| MgO | 380 ppm |

Based on the water-soluble $P_2O_5$ in the in the starting material, the recovery yield as phosphoric acid was 98.2 percent.

EXAMPLE II

Commercial granular single (normal) superphosphate was ground to pass a 20 mesh screen. The ground material had the following analysis:

| | |
|---|---|
| Total $P_2O_5$ | 22.46% |
| Water-soluble $P_2O_5$ | 17.45% |
| $SO_4$ | 35.12% |
| Ca | 21.63% |

50.0 parts of this ground single superphosphate were put into a laboratory blender. 50.0 parts of methanol and 22.9 parts of ammonium bisulfate were added and the resulting mixture was blended for 5 minutes. The blended slurry was immediately filtered and yielded 63.8 parts of filtrate which contained a total of 8.31 parts of $P_2O_5$, 0.36 parts $NH_4$ and 2.27 parts of $SO_4$. The residue from the filtration was washed with fresh methanol to remove any remaining methanol soluble $P_2O_5$, and the washings were combined with the main filtrate. The washed residue was dried and upon analysis was found to contain 2.92 parts of $P_2O_5$, 10.82 parts of Ca, 3.22 parts $NH_4$ and 34.40 parts of $SO_4$. The combined filtrate and washings were evaporated to recover the methanol and yielded a concentrated acid with the following weight analysis:

| | |
|---|---|
| $P_2O_5$ TN 60.13% | |
| $SO_4$ | 16.42% |
| $NH_4$ | 2.59% |
| F | 113 ppm |
| CaO | 25 ppm |
| $Al_2O_3$ | 80 ppm |
| $Fe_2O_3$ | 100 ppm |
| MgO | 350 ppm |

95.2 percent of the water-soluble $P_2O_5$ in the starting material was recovered as concentrated phosphoric acid.

EXAMPLE III 30.0 parts of commercial run-of-pile triple superphosphate (the same material as in Example I) were put into an agitated vessel. 30.0 parts of methanol and 9.0 parts of 93 percent sulfuric acid were added to the vessel. The resulting slurry was stirred for 3 hours — 30 minutes after which it was settled and the clear liquid was decanted. The settled solids were washed with methanol to displace any solvent containing $P_2O_5$, and the washings were combined with the main decanted liquor. 50.9 parts of rich solvent were obtained which contained a total of 12.44 parts of $P_2O_5$, and 1.58 parts of $SO_4$. The washed solids were dried and, when analyzed, were found to contain 1.72 parts of $P_2O_5$, 4.26 parts of Ca and 7.78 parts of $SO_4$. The rich solvent was evaporated to recover the methanol and yielded a concentrated acid with the following weight analysis:

| | |
|---|---|
| $P_2O_5$ | 59.54% |
| $SO_4$ | 7.57% |
| F | 978 ppm |
| CaO | 10 ppm |
| $Al_2O_3$ | 150 ppm |
| $Fe_2O_3$ | 2500 ppm |
| MgO | 500 ppm |

Of the water-soluble $P_2O_5$ in the starting material, 99.3 percent was recovered as concentrated phosphoric acid.

EXAMPLE IV 50.0 parts of commercial granular single superphosphate (the same material as in Example II) was thoroughly mixed with 50.0 parts of methanol and 10.5 parts of 96 percent sulfuric acid in a high speed blender for 5 minutes. The blended mixture was separated into a liquid portion and a solid portion. The solids were washed with fresh methanol to insure removal of all $P_2O_5$-containing solvent, and the washings were combined with the liquid portion. 65.9 parts of liquid were obtained which contained a total of 9.36 parts of $P_2O_5$ and 2.14 parts of $SO_4$. The dried solids were found to contain 1.87 parts of $P_2O_5$, 10.82 parts of Ca and 25.29 parts of $SO_4$. The liquid was evaporated to recover the methanol and produced a concentrated acid with the following weight analysis:

| | |
|---|---|
| $P_2O_5$ | 58.84% |
| $SO_4$ | 13.43% |
| F | 690 ppm |
| CaO | 15 ppm |
| $Al_2O_3$ | 1000 ppm |
| $Fe_2O_3$ | 3000 ppm |
| MgO | 1800 ppm |

In this example, 107.2 percent of the water-soluble $P_2O_5$ in the starting material was recovered as concentrated phosphoric acid. This indicates that a portion of the non-water soluble $P_2O_5$ was converted to a soluble form as a result of the treatment.

What is claimed is:

1. The method of producing concentrated phosphoric acid which comprises reacting monocalcium phosphate with a sulfate acid by mixing the reactants and methanol while maintaining the temperature of the mixture in the range below the boiling point of methanol and above about 0° C. for a period in the range from about 1 minute to 10 hours, wherein for each mol of the phosphate salt the amount of acid is in the range of 0.5 to 2.0 times the metathetical requirement, and wherein said acid is selected from the group consisting of sulfuric acid, ammonium bisulfate and mixtures thereof; physically separating the resulting reaction mixture into a liquid fraction of phosphoric acid dissolved in methanol and a solid fraction; and then separating phosphoric acid from said liquid fraction by evaporating said methanol; the liquid present in said reaction mixture constituting substantially the total amount of liquid employed in said method of producing concentrated phosphoric acid.

2. The method of claim 1 wherein for each part by weight of the salt, there is present an amount of methanol in the range 0.8 to 10 parts, and the mixture contains in parts by weight less than 50–60 parts of water per 100 parts of methanol.

3. The method of claim 1 wherein the amount of acid is in the range from about 0.9 to 1.2 times the metathetical requirement; in that the amount of methanol is in the range from about 1 to 3 parts; in that the temperature is in the range from about 15° to 50° C.; in that the salt has an average diameter of less than about ⅛-inch; and in that in parts by weight less than about 5 parts of water per 100 parts of methanol are present in the mixture.

4. A method for the production of concentrated phosphoric acid which comprises reacting monocalcium phosphate with a sulfate acid by mixing the reactants and methanol while maintaining the temperature of the mixture in the range from about 15° to 50° C. for a period in the range from about 1 minute to 10 hours, wherein for each mol of the phosphate salt the amount of acid is in the range from about 1.8 to 2.4 equivalents, wherein for each part by weight of the salt, there is present an amount of methanol in the range from about 0.8 to 3 parts, wherein said acid is selected from the group consisting of sulfuric acid, ammonium bisulfate and mixtures thereof, and wherein said mixture contains in parts by weight less than about 5 parts by weight of water per 100 parts of methanol; physically separating the resulting reaction mixture into a liquid fraction and a solid fraction; and removing methanol from the liquid fraction by fractional distillation; the liquid present in said reaction mixture constituting substantially the total amount of liquid employed in said method of producing concentrated phosphoric acid.

5. The method of claim 4 further characterized in that the methanol depleted liquid fraction is heated at a temperature in the range from about 100° to 300° C., thereby further concentrating the methanol depleted fraction and producing a phosphoric acid having a $P_2O_5$ content of at least about 72 weight percent.

6. The method of producing an inorganic phosphate salt which comprises reacting monocalcium phosphate with a sulfate acid by mixing the reactants and methanol while maintaining the temperature of the mixture in the range below the boiling point of methanol and above about 0° C. for a period in the range from about 1 minute to 10 hours, wherein for each mol of the phosphate salt the amount of acid is in the range of 0.5 to 2.0 times the metathetical requirement, and wherein said acid is selected from the group consisting of sulfuric acid, ammonium bisulfate and mixtures thereof; physically separating the resulting reaction mixture into a liquid fraction of phosphoric acid dissolved in methanol and a solid fraction; and then precipitating an inorganic phosphate salt selected from the group consisting of ammonium phosphate, alkali metal phosphates and alkaline earth metal phosphates from the liquid fraction of phosphoric acid dissolved in methanol by adding a base having a corresponding cation to said liquid fraction; the liquid present in said reaction mixture and said base constituting substantially the total amount of liquid employed in said method of producing an inorganic phosphate salt.

7. The method of producing an inorganic phosphate salt which comprises reacting monocalcium phosphate with a sulfate acid by mixing the reactants and methanol while maintaining the temperature of the mixture in the range from about 15° to 50° C. for a period in the range from about 1 minute to 10 hours, wherein for each mol of the phosphate salt the amount of acid is in the range from about 1.8 to 2.4 equivalents, wherein for each part by weight of the salt, there is present an amount of methanol in the range from about 0.8 to 3 parts, wherein said acid is selected from the group consisting of sulfuric acid, ammonium bisulfate and mixtures thereof, and wherein said mixture contains in parts by weight less than about 5 parts by weight of water per 100 parts of methanol; physically separating the resulting reaction mixture into a liquid fraction and a solid fraction; and then precipitating an inorganic phosphate salt selected from the group consisting of ammonium phosphate, alkali metal phosphates and alkaline earth metal phosphates from the liquid fraction of phosphoric acid dissolved in methanol by adding a base having a corresponding cation to said liquid fraction; the liquid present in said reaction mixture and said base constituting substantially the total amount of liquid employed in said method of producing an inorganic phosphate salt.

* * * * *